US00RE50533E

(19) United States
(12) Reissued Patent
Akana et al.

(10) Patent Number: US RE50,533 E
(45) Date of Reissued Patent: Aug. 19, 2025

(54) ELECTRONIC DEVICE

(71) Applicant: Apple Inc., Cupertino, CA (US)

(72) Inventors: Jody Akana, San Francisco, CA (US); Bartley K. Andre, Palo Alto, CA (US); Jeremy Bataillou, San Francisco, CA (US); Daniel J. Coster, San Francisco, CA (US); Daniele De Iuliis, San Francisco, CA (US); M. Evans Hankey, San Francisco, CA (US); Julian Hoenig, San Francisco, CA (US); Richard P. Howarth, San Francisco, CA (US); Jonathan P. Ive, San Francisco, CA (US); Duncan Robert Kerr, San Francisco, CA (US); Matthew Dean Rohrbach, San Francisco, CA (US); Peter Russell-Clarke, San Francisco, CA (US); Mikael Silvanto, San Francisco, CA (US); Christopher J. Stringer, Woodside, CA (US); Eugene Antony Whang, San Francisco, CA (US); Rico Zörkendörfer, San Francisco, CA (US)

(73) Assignee: Apple Inc., Cupertino, CA (US)

(21) Appl. No.: 29/905,192

(22) Filed: Oct. 17, 2023

Related U.S. Patent Documents

Reissue of:
(64) Patent No.: Des. 888,048
Issued: Jun. 23, 2020
Appl. No.: 29/628,136
Filed: Dec. 1, 2017

U.S. Applications:
(60) Division of application No. 29/843,804, filed on Jun. 23, 2022, which is an application for the reissue of
(Continued)

(51) LOC (15) Cl. ..... 14-02
(52) U.S. Cl.
USPC ..... D14/315

(58) Field of Classification Search
USPC ..... D14/300, 301, 302, 315, 316, 318, 320, D14/322, 328, 333, 334, 335, 345, 348,
(Continued)

(56) References Cited

U.S. PATENT DOCUMENTS 5,694,292 A 12/1997 Paulsel et al.
5,694,294 A 12/1997 Ohashi et al.
(Continued)

OTHER PUBLICATIONS

U.S. Appl. No. 29/579,020, filed Sep. 27, 2016. (Abandoned).
U.S. Appl. No. 29/579,020, filed Sep. 27, 2016. (Unpublished).

*Primary Examiner* — Philip S Hyder
(74) *Attorney, Agent, or Firm* — Saidman DesignLaw Group, LLC

(57) CLAIM

The ornamental design for an electronic device, as shown and described.

DESCRIPTION

FIG. 1 is a top, front perspective view of an electronic device showing our new design;
FIG. 2 is a bottom, rear perspective thereof;
FIG. 3 is front view thereof;
FIG. 4 is rear view thereof;
FIG. 5 is a left side view thereof;
FIG. 6 is a right side view thereof;
FIG. 7 is a top view thereof;
FIG. 8 is a bottom view thereof;
FIG. 9 is a top, front perspective view of another embodiment thereof;
FIG. 10 is a bottom, rear perspective view thereof;
FIG. 11 is a front view thereof;
FIG. 12 is a rear view thereof;
FIG. 13 is a left side view thereof;
FIG. 14 is a right side view thereof;
FIG. 15 is a top view thereof;
(Continued)

amended

FIG. 16 is a bottom view thereof; and,
FIG. 17 is an enlarged view of FIG. 9 thereof.
The dashed broken lines illustrate structure or features which form no part of the claimed design.
The dot-dash broken lines identify an area of enlargement.

1 Claim, 15 Drawing Sheets

Matter enclosed in heavy brackets [ ] appears in the original patent but forms no part of this reissue; matter printed in italics indicates the additions made by reissue.

Related U.S. Application Data

Pat. No. Des. 888,048, which is a continuation of application No. 29/579,020, filed on Sep. 27, 2016, now abandoned, which is a continuation of application No. 29/492,411, filed on May 30, 2014, now Pat. No. Des. 775,623, which is a continuation of application No. 29/464,931, filed on Aug. 22, 2013, now Pat. No. Des. 708,176, which is a continuation of application No. 29/443,018, filed on Jan. 11, 2013, now Pat. No. Des. 691,129, which is a division of application No. 29/424,261, filed on Jun. 8, 2012, now Pat. No. Des. 676,437, which is a continuation of application No. 29/420,873, filed on May 14, 2012, now Pat. No. Des. 676,438.

(58) Field of Classification Search
USPC ..... D14/392, 434, 455, 456, 457; D18/2, 7, D18/11
CPC ..... G06F 1/16; G06F 1/1616; G09B 13/04; H01R 35/02; H03K 17/94; H03M 11/00
See application file for complete search history.

(56) References Cited

U.S. PATENT DOCUMENTS

| | | | | | |
|---|---|---|---|---|---|
| 5,713,790 | A | | 2/1998 | Lin | |
| 6,038,128 | A | | 3/2000 | Hood et al. | |
| 6,067,224 | A | | 5/2000 | Nobuchi | |
| D431,821 | S | | 10/2000 | Mizuno | |
| D493,785 | S | | 8/2004 | Andre et al. | |
| 6,771,494 | B2 | | 8/2004 | Shimano | |
| 6,775,129 | B1 | | 8/2004 | Ghosh et al. | |
| D517,063 | S | | 3/2006 | Nakajima et al. | |
| D523,429 | S | | 6/2006 | Lin | |
| D524,306 | S | | 7/2006 | Yun et al. | |
| D526,999 | S | | 8/2006 | Tago | |
| D533,550 | S | | 12/2006 | Yamada | |
| D571,364 | S | | 6/2008 | Andre et al. | |
| D572,246 | S | | 7/2008 | Andre et al. | |
| 7,426,113 | B2 | | 9/2008 | Ikeno et al. | |
| D581,411 | S | * | 11/2008 | Kumano | D14/318 |
| D601,138 | S | | 9/2009 | Solomon et al. | |
| D604,290 | S | | 11/2009 | Andre et al. | |
| D604,291 | S | * | 11/2009 | Andre | D14/315 |
| D604,292 | S | | 11/2009 | Andre et al. | |
| D604,293 | S | | 11/2009 | Andre et al. | |
| D606,988 | S | | 12/2009 | Andre et al. | |
| D606,989 | S | | 12/2009 | Andre et al. | |
| D611,045 | S | | 3/2010 | Andre et al. | |
| D617,789 | S | | 6/2010 | Akana et al. | |
| D621,825 | S | | 8/2010 | Andre et al. | |
| D623,645 | S | | 9/2010 | Andre et al. | |
| D633,087 | S | * | 2/2011 | Andre | D14/315 |
| D642,172 | S | | 7/2011 | Akana et al. | |
| D642,560 | S | | 8/2011 | Akana et al. | |
| D648,333 | S | | 11/2011 | Andre et al. | |
| D648,334 | S | | 11/2011 | Andre et al. | |
| D652,032 | S | | 1/2012 | Akana et al. | |
| D655,704 | S | | 3/2012 | Akana et al. | |
| D657,786 | S | | 4/2012 | Andre et al. | |
| D661,296 | S | | 6/2012 | Akana et al. | |
| D662,497 | S | | 6/2012 | Akana et al. | |
| D676,437 | S | | 2/2013 | Akana et al. | |
| D676,438 | S | * | 2/2013 | Akana | D14/318 |
| D682,821 | S | * | 5/2013 | Kim | D14/315 |
| D682,824 | S | * | 5/2013 | Kim | D14/315 |
| D686,205 | S | * | 7/2013 | Akana | D14/318 |
| D686,611 | S | * | 7/2013 | Lin | D14/315 |
| D691,128 | S | | 10/2013 | Akana et al. | |
| D691,129 | S | | 10/2013 | Akana et al. | |
| D708,176 | S | | 7/2014 | Akana et al. | |
| D723,539 | S | * | 3/2015 | Andre | D14/315 |
| D741,316 | S | | 10/2015 | Andre et al. | |
| D755,623 | S | | 5/2016 | Shirosawa | |
| D763,249 | S | * | 8/2016 | Lee | D14/315 |
| D766,233 | S | * | 9/2016 | Lam | D14/315 |
| D768,619 | S | * | 10/2016 | Akana | D14/315 |
| D787,500 | S | * | 5/2017 | Akana | D14/315 |
| D806,700 | S | * | 1/2018 | Akana | D14/315 |
| D816,661 | S | * | 5/2018 | Akana | D14/315 |
| 2005/0018396 | A1 | | 1/2005 | Nakajima et al. | |
| 2005/0041378 | A1 | | 2/2005 | Hamada et al. | |
| 2008/0074833 | A1 | | 3/2008 | Chien et al. | |
| 2009/0040708 | A1 | | 2/2009 | Tatsukami et al. | |
| 2010/0091442 | A1 | | 4/2010 | Theobald et al. | |
| 2011/0182015 | A1 | | 7/2011 | Chen et al. | |
| 2011/0255242 | A1 | * | 10/2011 | Shao | G06F 3/0338 361/679.01 |
| 2012/0099263 | A1 | | 4/2012 | Lin | |
| 2012/0099264 | A1 | | 4/2012 | Degner et al. | |
| 2013/0327556 | A1 | * | 12/2013 | Casebolt | G06F 1/1616 174/82 |
| 2013/0329359 | A1 | | 12/2013 | Andre et al. | |

* cited by examiner

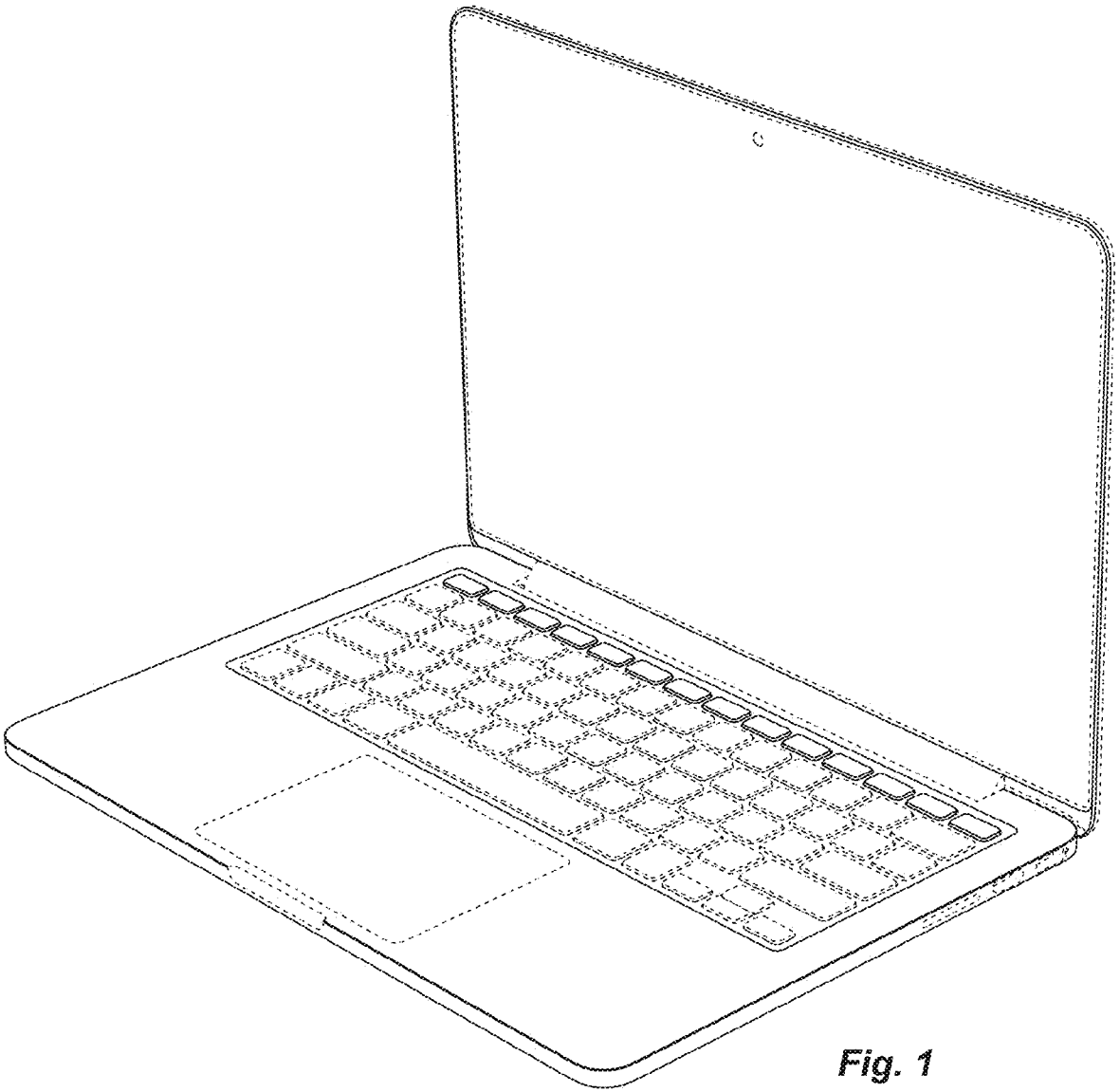
Fig. 1
amended

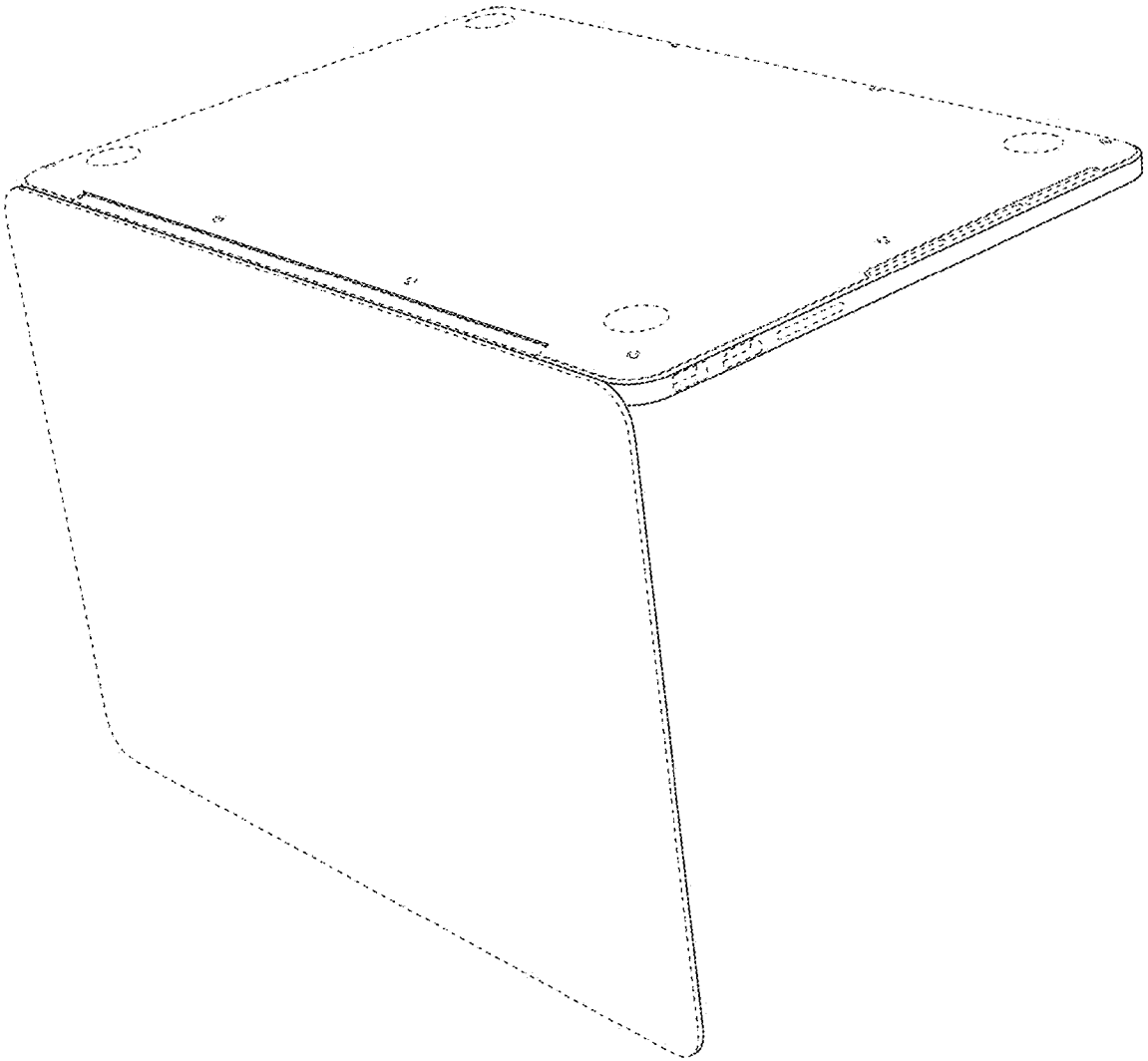
Fig. 2
amended

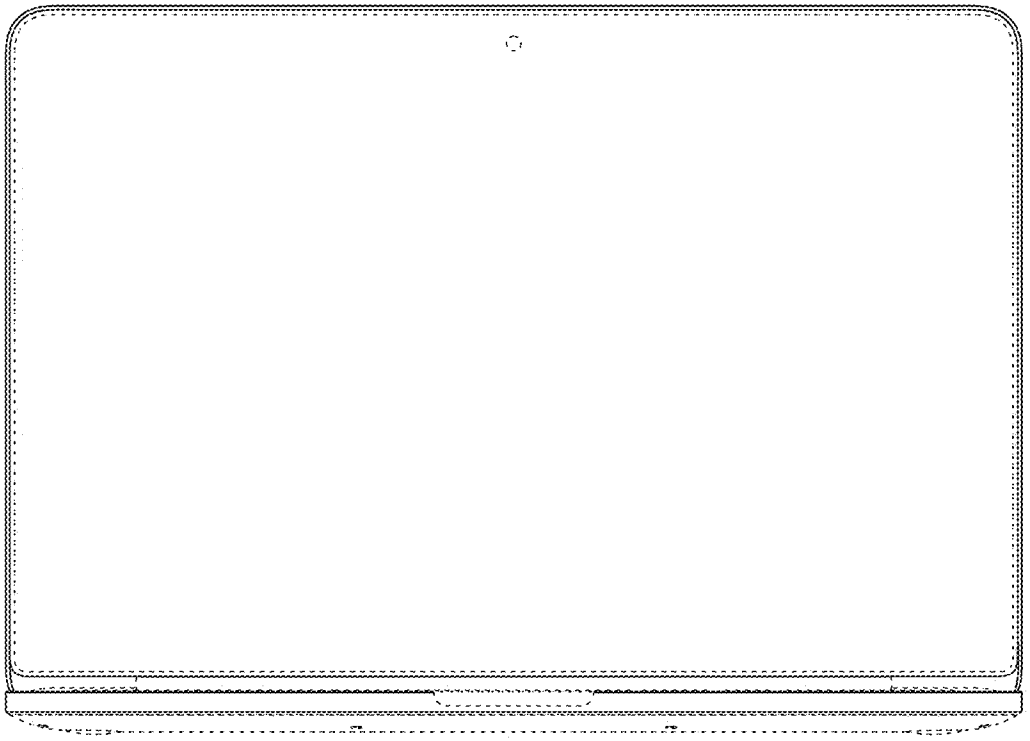
Fig. 3
amended

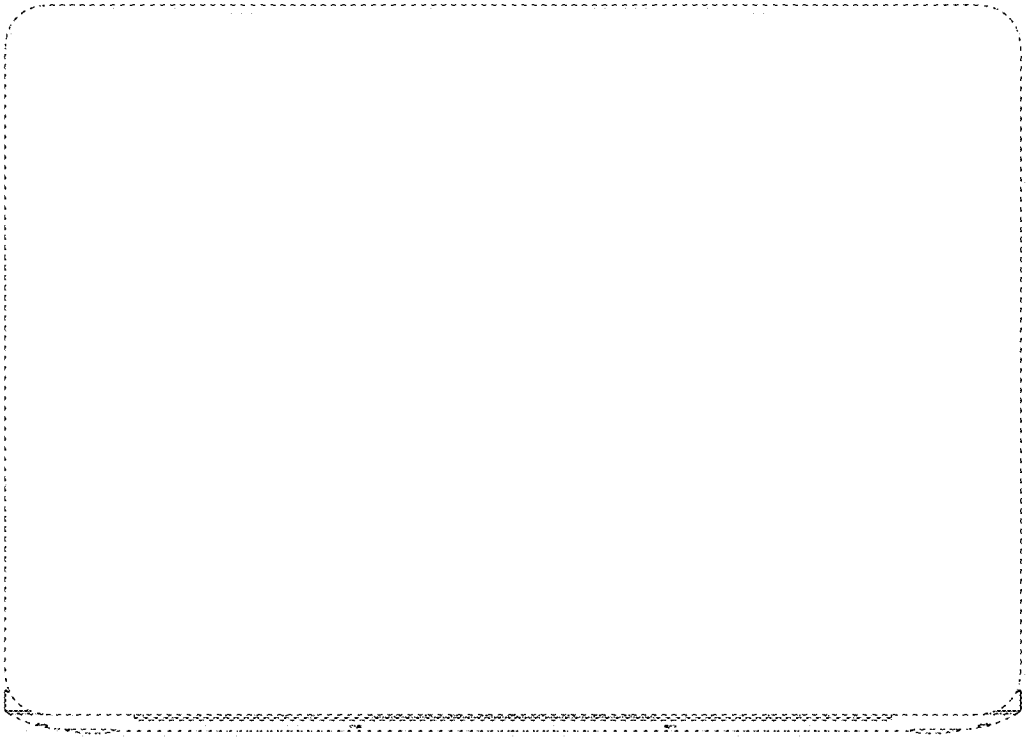
Fig. 4
amended

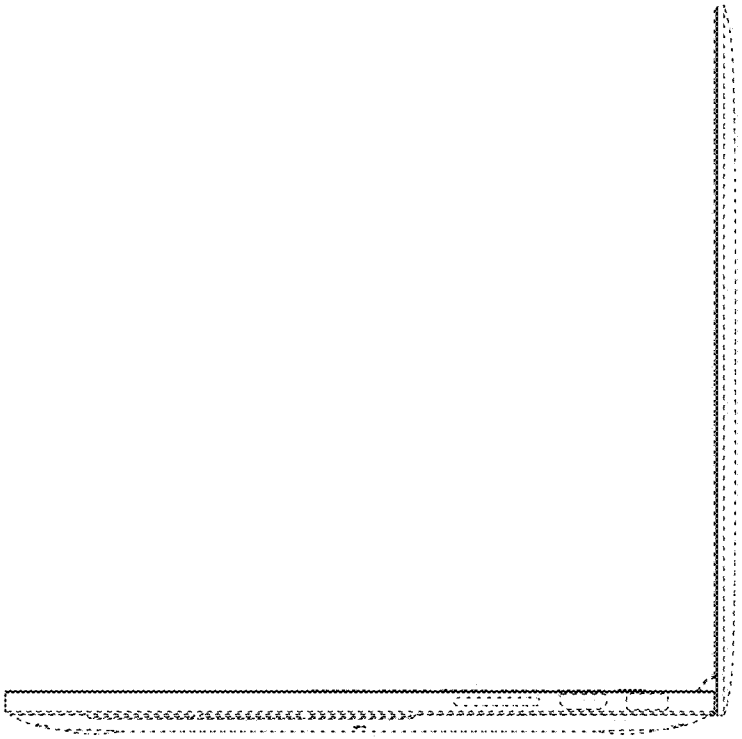
Fig. 6
amended
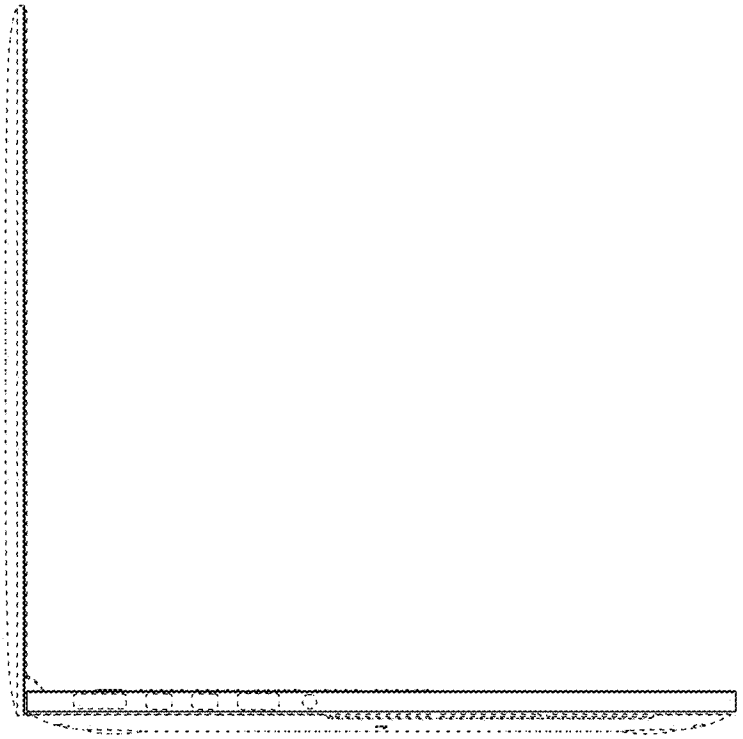
Fig. 5
amended

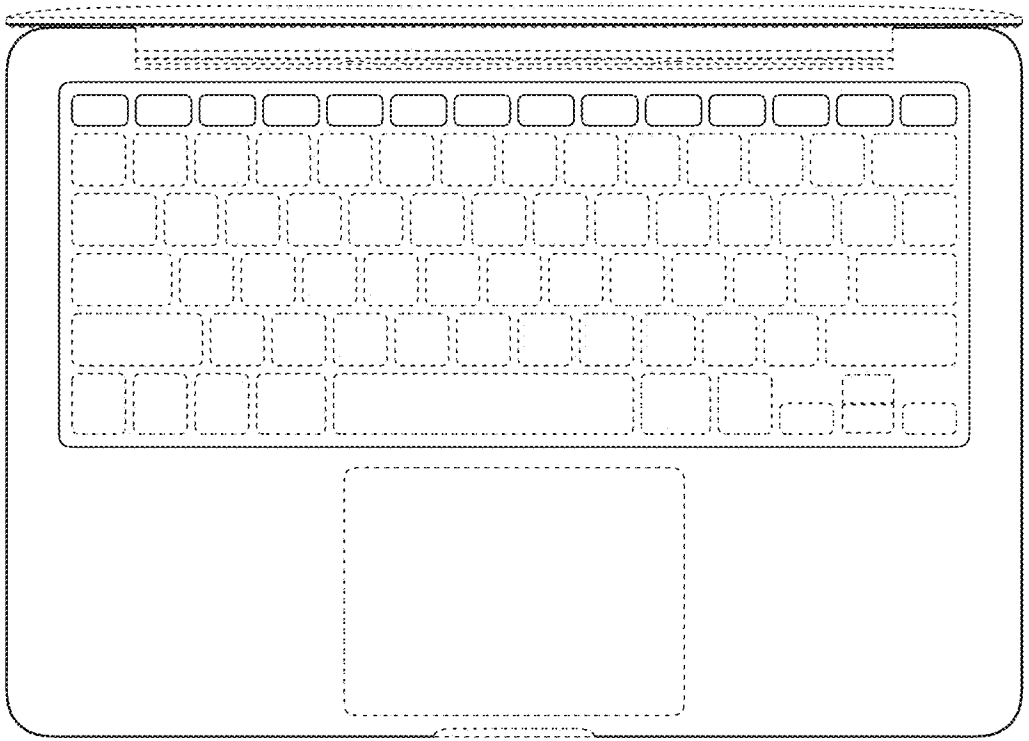
Fig. 7
amended

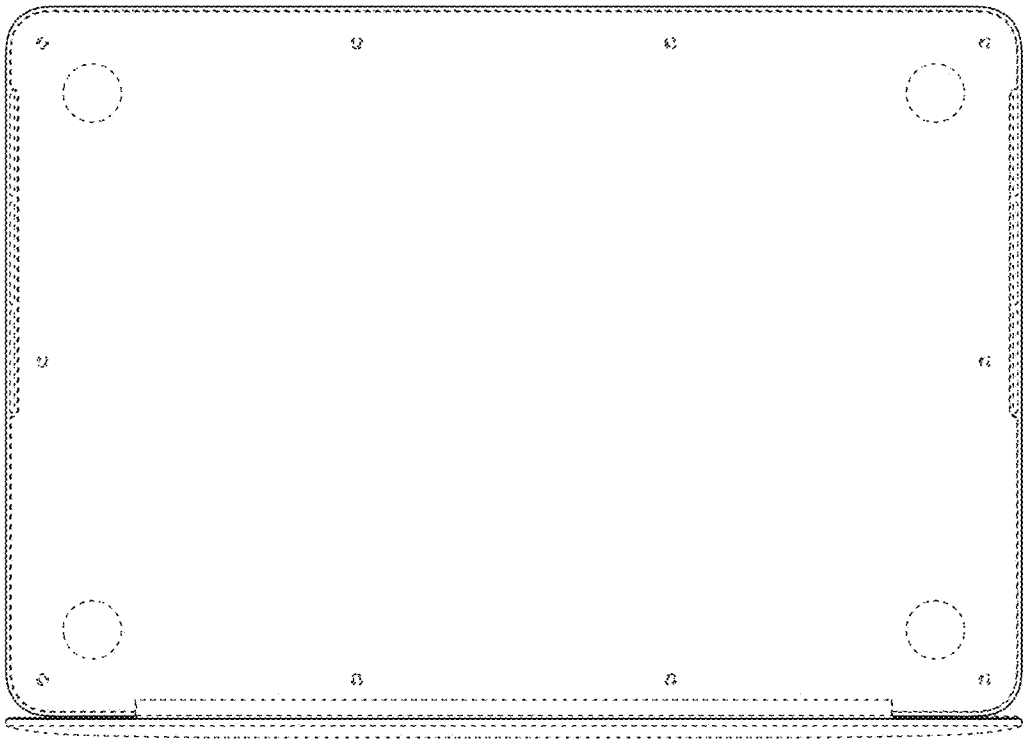
Fig. 8
amended

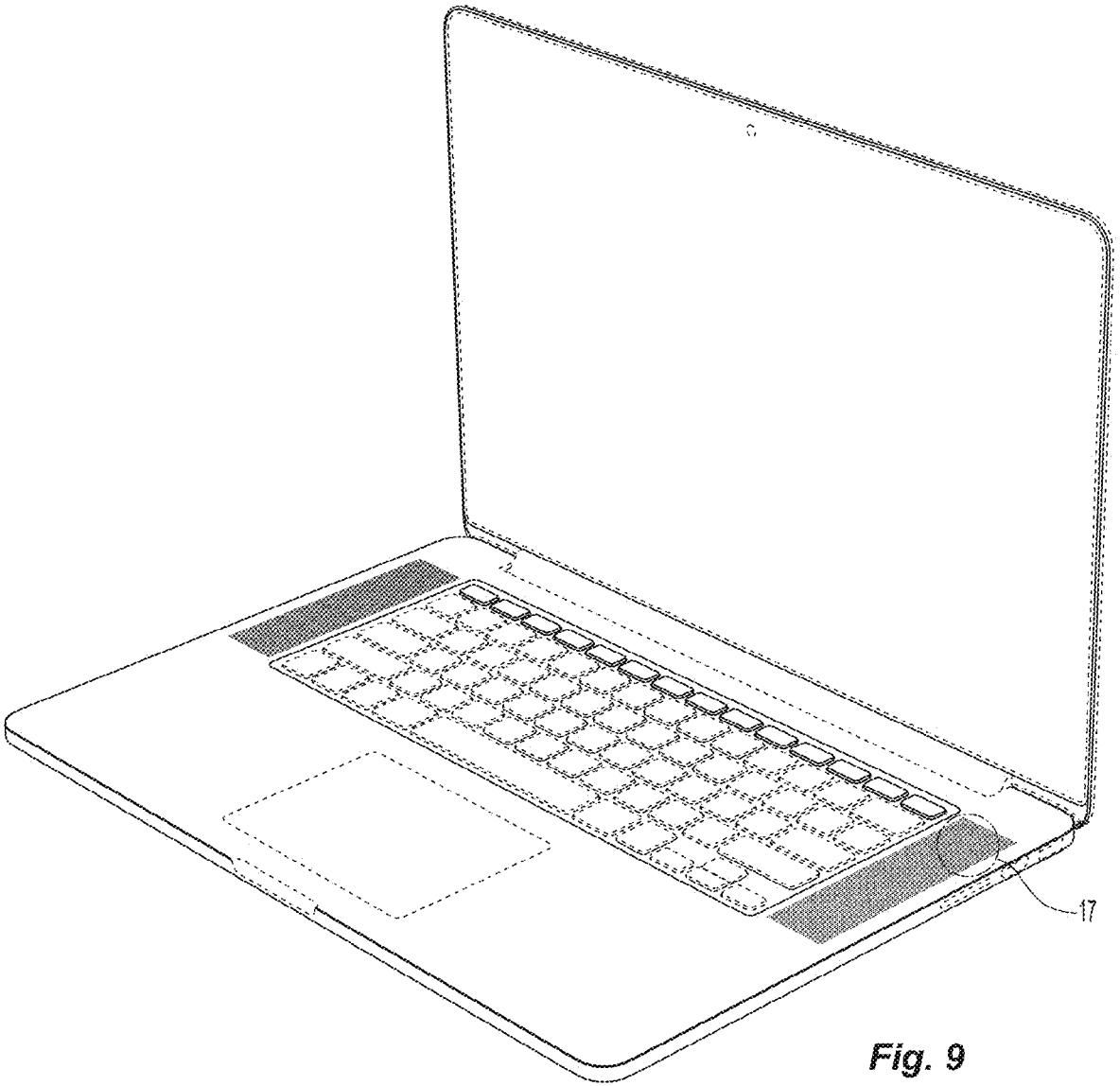
Fig. 9
amended

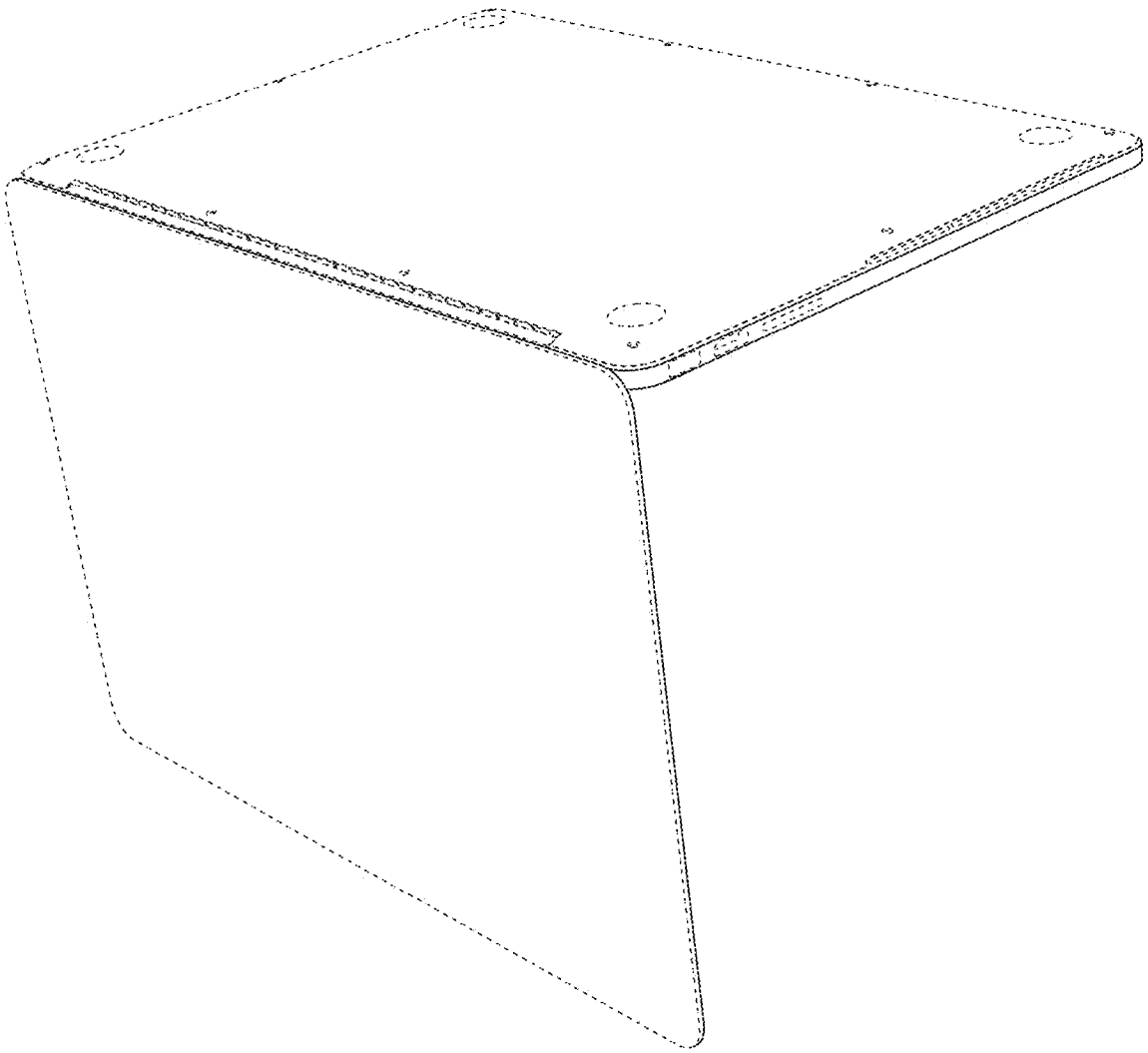
Fig. 10
amended

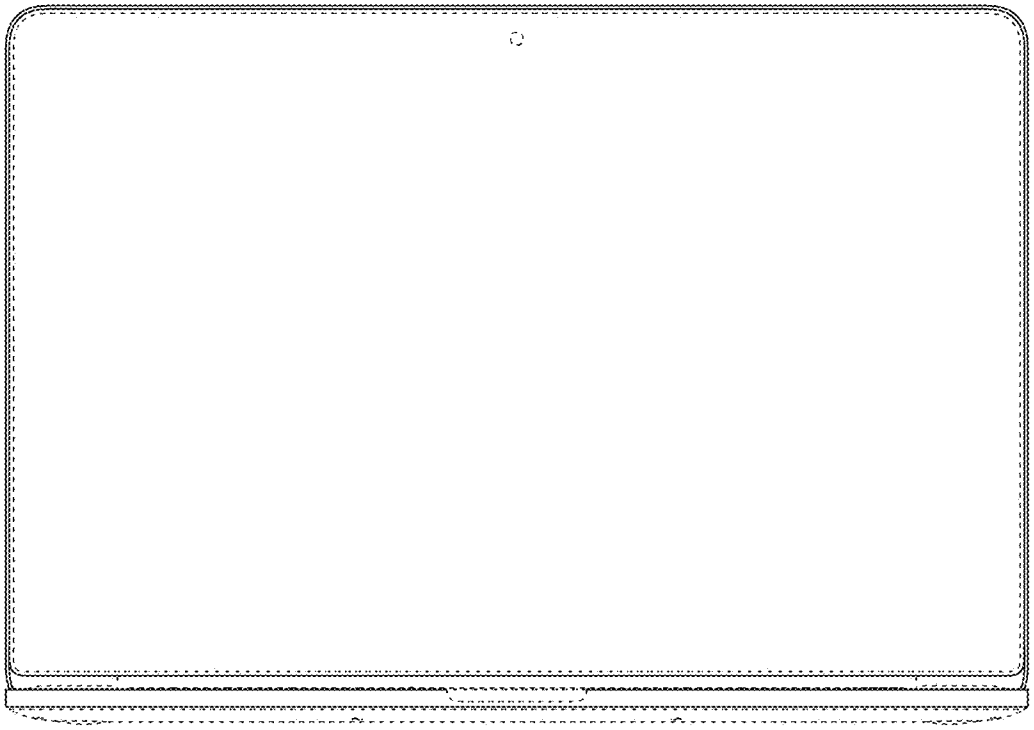
Fig. 11
amended

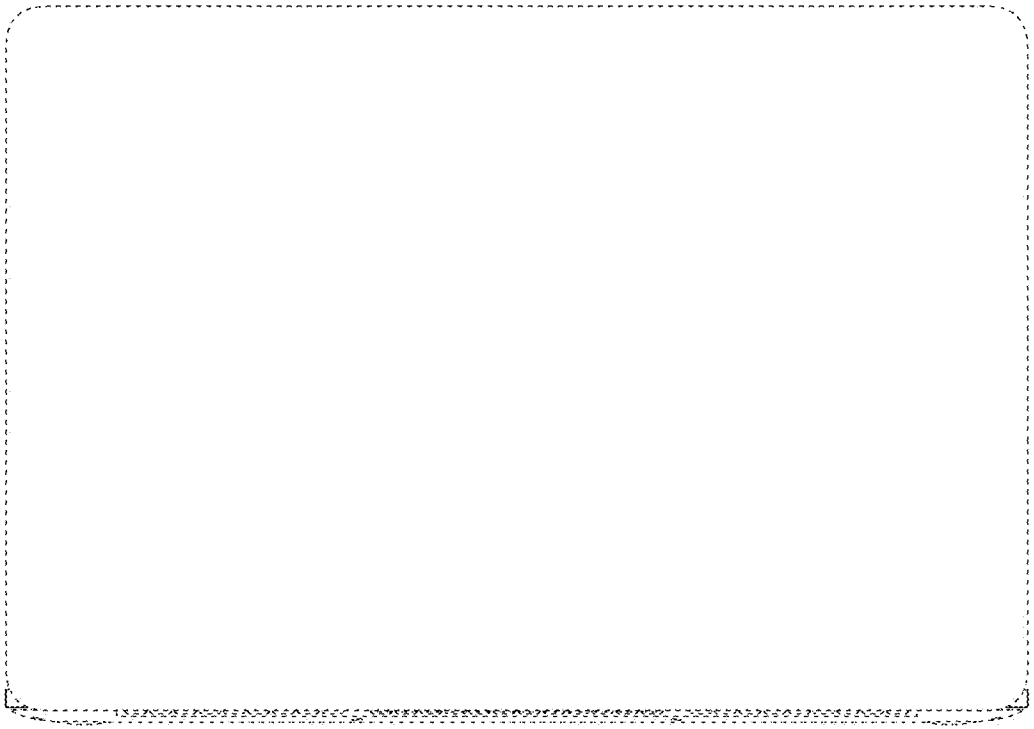
Fig. 12
amended

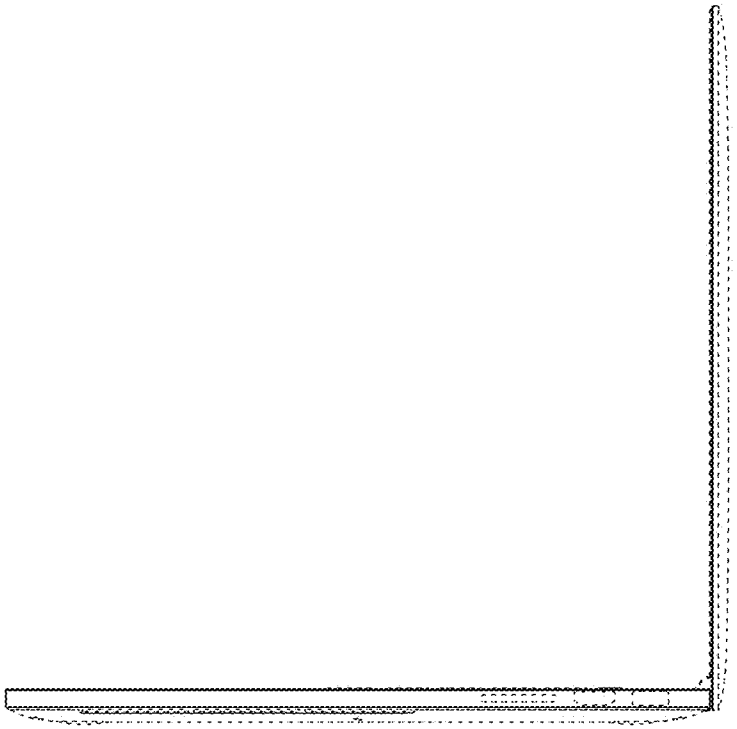
Fig. 14
amended
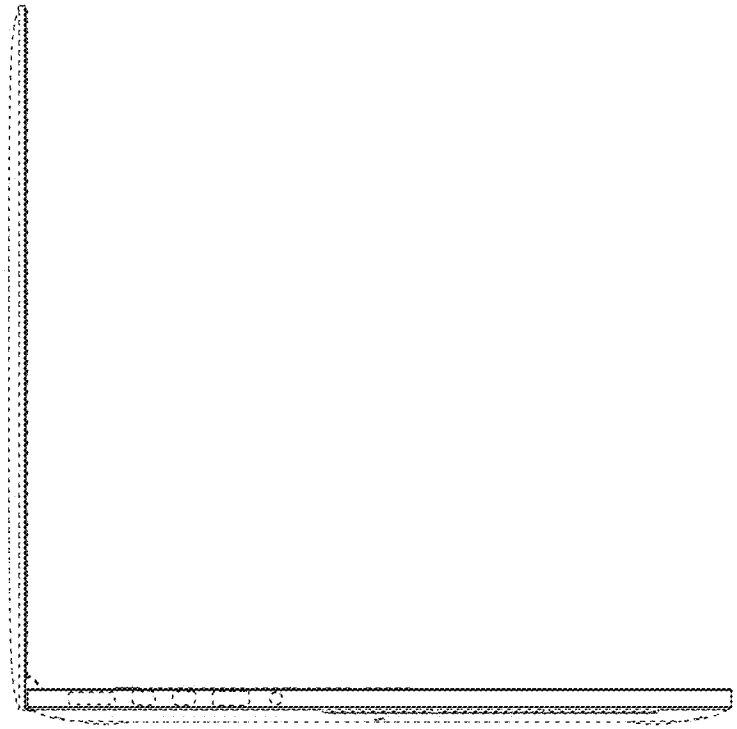
Fig. 13
amended

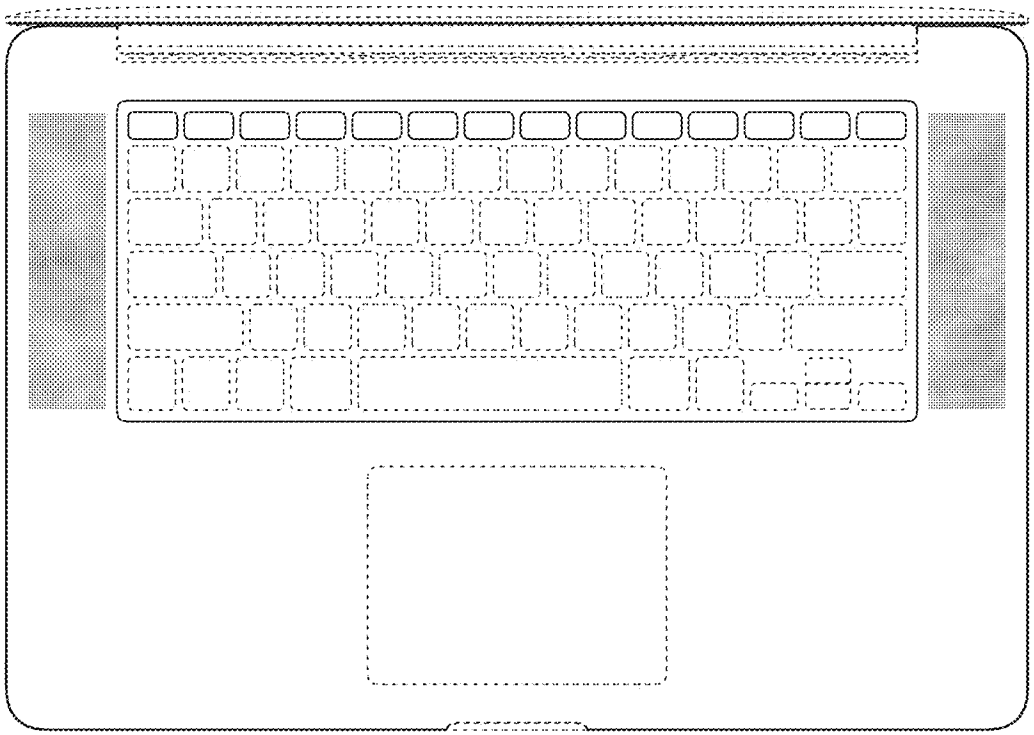
Fig. 15
amended

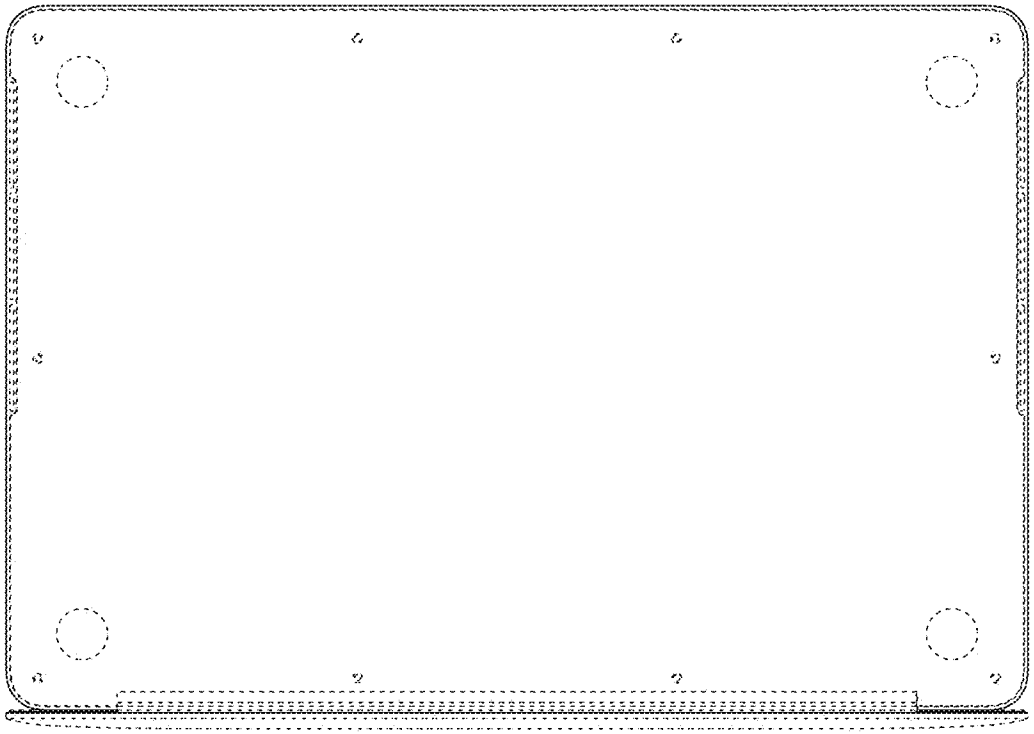
Fig. 16
amended

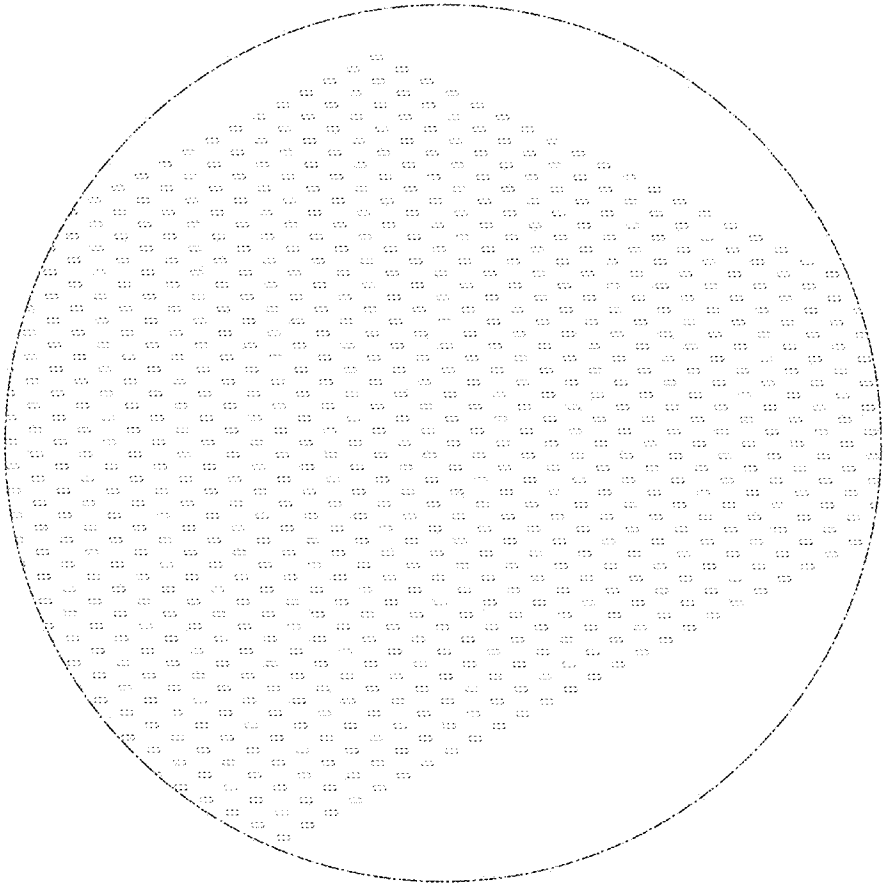
Fig. 17
amended